United States Patent [19]

Fujiki

[11] Patent Number: 4,521,480
[45] Date of Patent: Jun. 4, 1985

[54] MAGNETIC RECORDING MEDIA OF THE HIGH RECORDING DENSITY TYPE COMPRISING BOTH TITANIUM MONOXIDE AND MAGNETIC ALLOY POWDERS IN A MAGNETIC LAYER

[75] Inventor: Kuniharu Fujiki, Mito, Japan

[73] Assignee: Victor Company of Japan, Limited, Japan

[21] Appl. No.: 521,578

[22] Filed: Aug. 9, 1983

[30] Foreign Application Priority Data

Aug. 10, 1982 [JP] Japan ............... 57-137890

[51] Int. Cl.³ .............................. B32B 5/16
[52] U.S. Cl. ..................... 428/328; 428/694; 428/900
[58] Field of Search ........... 428/692, 694, 900, 329, 428/480, 483, 323, 328; 252/62.55; 427/127, 131

[56] References Cited

U.S. PATENT DOCUMENTS

| 3,833,412 | 9/1974 | Akashi et al. ............. 252/62.54 |
| 3,916,039 | 10/1975 | Akashi et al. ............. 427/132 |
| 3,929,658 | 12/1975 | Beske ...................... 428/329 |
| 4,047,232 | 9/1977 | Hisagen et al. ............. 428/900 |
| 4,117,190 | 9/1978 | Akashi et al. ............. 428/900 |
| 4,135,031 | 1/1979 | Akashi et al. ............. 428/900 |
| 4,275,115 | 6/1981 | Naruse ..................... 428/694 |
| 4,285,825 | 8/1981 | Isobe et al. . |
| 4,379,803 | 4/1983 | Tamai et al. ............... 428/694 |
| 4,420,408 | 12/1983 | Kajimoto et al. .......... 252/62.54 |
| 4,423,452 | 12/1983 | Kajimoto et al. .......... 428/694 |

FOREIGN PATENT DOCUMENTS 2941446  4/1980  Fed. Rep. of Germany .

Primary Examiner—George F. Lesmes
Assistant Examiner—William M. Atkinson
Attorney, Agent, or Firm—Lowe, King, Price & Becker

[57] ABSTRACT

A magnetic recording medium of the high recording density type is disclosed, which comprises a support, and a magnetic recording layer formed on at least one side of the support. The magnetic recording layer is made of a dispersion, in a binder, of magnetic alloy particles and TiO particles in an amount of from 0.1 to 20 wt % of said magnetic alloy particles.

6 Claims, 1 Drawing Figure

AMOUNT OF TiO PARTICLES WITH A SIZE OF 0.05 MICRON (PARTS BY WEIGHT)

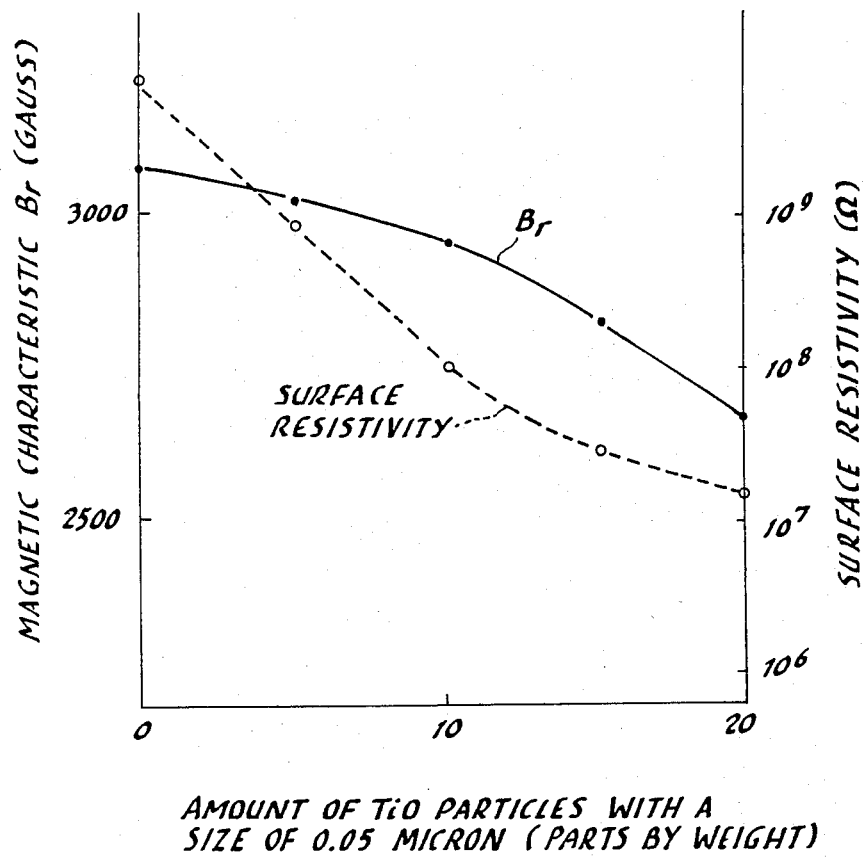

MAGNETIC RECORDING MEDIA OF THE HIGH RECORDING DENSITY TYPE COMPRISING BOTH TITANIUM MONOXIDE AND MAGNETIC ALLOY POWDERS IN A MAGNETIC LAYER

BACKGROUND OF THE INVENTION

1. Field of the Invention

This invention relates to magnetic recording media which are improved in various properties such as magnetic characteristics, travelling performance, durability, and abrasion resistance. The term "magnetic recording media" used herein is intended to mean almost all kinds of magnetic recording media in the form of tapes, discs, cards, and the like.

2. Description of the Prior Art

Magnetic recording media especially for use in video tape recorders, while being travelled or run at the time of recording or reproducing operations, are intensely contacted with magnetic heads, guide pins and the like. Since during contact, the magnetic layer of the media suffers a frictional loss, the layer must have excellent abrasion resistance. It is also necessary that the electrostatic charging of the media be suppressed as little as possible when the media are repeatedly travelled to lessen travelling troubles.

Home video tape recorders have now become popular with an attendant development of small-size, portable video tape recorders. Further, video tape recorders having a built-in video camera have been developed. These developments in recording and reproducing apparatus, in turn, require the development of magnetic tapes which make use of magnetic alloy powders of much higher coersive forces than ferromagnetic metal oxides or metals in order to improve a recording density of the tape. In addition, for the improvement of the abrasion resistance of this type of magnetic tape, an attempts have been made to use alumina, carborundum, chromium oxide, titanium dioxide, and the like as a non-magnetic component for the magnetic layer.

However, these additives involve the problem of excessively abrading of magnetic heads and a decreased packing density of the magnetic powder in the magnetic layer. Additionally, it is necessary to use the additives in combination with carbon black so as to solve the antistatic problem.

SUMMARY OF THE INVENTION

It is an object of the invention to provide magnetic recording media which have a high recording density and are excellent in abrasion resistance, travelling performance, antistatic property, durability and the like.

It is another object of the invention to provide magnetic recording media which cause little trouble with both fluctuation of reproduced pictures and clogging of magnetic heads and guide pins.

The above objects can be achieved, according to the invention, by a magnetic recording medium of the high recording density type which comprises a support, and a magnetic recording layer formed at least on one side of the support and made of a magnetic alloy powder and a titanium monoxide powder in an amount of 0.1 to 20 wt% of the magnetic alloy powder, both dispersed in a resin binder. In other words, the present invention is characterized by the combination of magnetic alloy and titanium monoxide powders contained in the magnetic recording layer. The magnetic recording layer may be formed either on one side or opposite sides of the support, which depends on the type of medium.

BRIEF DESCRIPTION OF THE DRAWING

The sole FIGURE is a graphical representation of a residual magnetism characteristic and a surface resistivity in relation to the amount of TiO particles having an average size of 0.05 micron.

DETAILED DESCRIPTION AND PREFERRED EMBODIMENTS OF THE INVENTION

The magnetic layer is made of a dispersion of TiO particles and magnetic alloy particles in a binder resin. The TiO particles are used in an amount of from 0.1 to 20 wt% of the magnetic alloy particles. TiO is usually obtained a black or grey cubic crystals having a specific gravity of 4.0 to 4.9 and a resistivity of $10^{-2}$ ohm-cm. The TiO particles have an average size of from 0.01 to 5 microns, preferably 0.05 to 1.0 micron. Larger sizes will contribute to improve the still reproduction characteristic but undesirably abrade magnetic heads or the like parts. Smaller sizes tend to lower the still reproduction characteristic. TiO is conductive, so that addition of conductive materials such as carbon black is not necessary in order to prevent the medium from being electrostatically charged during the course of recording and reproducing operations. The TiO powder is found to be more effective in attaining high recording density when used in combination with magnetic alloy particles than with magnetic metals or oxide particles. This is because of higher coersive forces of the magnetic alloys. Examples of the magnetic alloys include Fe-Ni; Fe-Co, Co-Ni, Fe-Co-Ni and the like alloys with or without additional metals such as Al, Cr, Mn, Cu, Zn, Mg, Si and the like. The alloys are finely divided to have an average size of from 0.01 to 1 micron.

Binders for dispersing the TiO and magnetic alloy particles therein are any known thermoplastic resins, thermosetting resins and mixtures thereof. These binder resins are well known in the art and are briefly discussed herein. Typical examples of the thermoplastic resins include vinyl chloride-vinyl acetate copolymers, vinyl chloride-vinylidene chloride copolymers, acrylic ester-styrene copolymers, methacrylic ester-styrene copolymers, acrylic ester-vinylidene chloride copolymers, methacrylic ester-vinylidene chloride copolymers, urethane elastomers, cellulose derivatives, vinyl chloride-vinyl acetate-vinyl alcohol terpolymers, and various other synthetic rubber resins. Examples of the thermosetting resins include phenolic resins, epoxy resins, curable polyurethane resins, urea resins, melamine resins, alkyd resins, silicone resins, urea-formaldehyde resins, mixtures of isocyanates and polyols, and the like. As a matter of course, these binders may be used singly or in combination. Typical solvents for these binders are aromatic compounds such as xylene, toluene and the like, ketones such as methyl ethyl ketone, methyl isobutyl ketone and the like, and mixtures thereof.

The dispersion of magnetic alloy particles and TiO particles in a binder may further comprise known additives such as dispersing agents, lubricants, abrasive agents, anti-static agents, and the like. These additives are well known and are not necessarily essential for the purpose of the invention. So, these additives are not particularly described herein.

In order to manufacture a magnetic recording medium of the present invention, predetermined amounts of magnetic alloy particles and TiO particles are dispersed in a binder and a solvent along with suitable additives. In general, the alloy particles are used in an amount of 200 to 800 parts by weight per 100 parts by weight of the binder. The resulting dispersion is then coated onto a non-magnetic support at least on one side thereof and is dried and after calendering, cured under conditions which depend on the type of binder used. The coating is effected by any known techniques such as an air knife coating, blade coating, dip coating, various roller coatings, spray coating and the like. The resulting recording layer has generally a thickness of 0.5 to 12 microns after calendering. It is to be noted that average sizes of TiO and magnetic alloy particles should preferably be below the thickness of the the recording layer. Thus unfavorable abrasion loss of recording heads or other metal parts can be reduced to a substantial extent.

Supports suitable for the purpose of the invention include films, foils, or sheets of a variety of materials including, for example, synthetic or semi-synthetic resins such as polyesters, polyolefins, cellulose derivatives, etc. metals such as aluminium, copper and the like, and glasses or ceramics. Of these, synthetic resins including polyesters are preferably used.

The present invention is particularly described by way of examples.

EXAMPLE 1

One hundred parts by weight of a about 5% Ni-Fe alloy powder having a coersive force, Hc, as high as 1400 Oe, a specific surface area of 40 m$^2$/g as determined by the BET method, and a size of 0.35 microns, 10 parts by weight of vinyl chloride-vinyl acetate-vinyl alcohol terpolymer, 10 parts by weight of a polyurethane elastomer, 1 part by weight of lecithin, 300 parts by weight of a mixed solvent of methyl ethyl ketone, toluene and methyl isobutyl ketone, and 5 parts by weight of TiO particles having an average size of 0.05 micron were mixed in a sand mill for about 20 hours. To the mixture was added 5 parts by weight of a polyisocyanate. The resulting magnetic paint was applied onto a 14.5 micron thick polyester film, dried and calendered. The calendered film was cured at a temperature of about 60° C. for 24 hours. It was found that the magnetic layer had a thickness of 5.5 microns. The cured film was slit into a ½ inch wide magnetic tape for use in a video tape recorder.

EXAMPLE 2

The general procedure of Example 1 was repeated using 10 parts by weight of the titanium monoxide particles, thereby obtaining a magnetic tape.

EXAMPLE 3

The general procedure of Example 1 was repeated using titanium monoxide particles having an average size of 0.2 micron, thereby obtaining a magnetic tape.

EXAMPLE 4

The general procedure of Example 1 was repeated using titanium monoxide particles having an average size of 1 micron, thereby obtaining a magnetic tape.

EXAMPLE 5

The general procedure of Example 1 was repeated using titanium monoxide particles having an average size of 5 microns, thereby obtaining a magnetic tape.

COMPARATIVE EXAMPLES 1-3

The general procedure of Example 1 was repeated using, instead of TiO particles, particles of Al$_2$O$_3$, Cr$_2$O$_3$, and TiO$_2$, thereby obtaining magnetic tapes.

The magnetic tapes obtained in the above Examples and Comparative Examples were each subjected to the measurement of a static magnetic characteristic or residual magnetism, Br, in the magnetic field of 5 KOe. As a result, it was found the Br value was 3010 gausses for the tape of Example 1, 2870 gausses for the tape of Example 2, 2910 gausses for the tape of Example 3, 3100 gausses for the tape of Example 4, 3070 gausses for the tape of Example 5, 2890 gausses for the tape of Comparative Example 1, 2910 gausses for the tape of Comparative Example 2, and 2820 gausses for the tape of Comparative Example 3. When compared at the same content level of the oxide additives, the magnetic tapes of the present invention are improved in the magnetic characteristic by 100 to 290 gausses over the comparative tapes.

The magnetic tapes were each brought into contact with a 40 mm$\phi$ rotary drum and the rotary drum was rotated at 200 r.p.m. to determine an abrasion resistance or still reproduction characteristic from a variation in coefficient of kinetic friction. As a result, it was found that the tapes of the present invention were superior to the tapes of Comparative Examples. In particular, the tape of Comparative Example 1 was very poor.

Moreover, each tape was subjected to the measurement of a surface resistivity thereof. The following results were obtained.

| Example No. | Surface Resistivity (Ohms) |
| --- | --- |
| 1 | 1.2 × 10$^8$ |
| 2 | 9.0 × 10$^7$ |
| 3 | 8.5 × 10$^8$ |
| 4 | 5.0 × 10$^8$ |
| 5 | 7.8 × 10$^7$ |
| Com. Ex. 1 | 4.0 × 10$^{10}$ |
| Com. Ex. 2 | 1.6 × 10$^9$ |
| Com. Ex. 3 | 3.2 × 10$^9$ |

From the above results, it will be seen that the magnetic recording media of the present invention have an excellent antistatic effect, with the result that dust will be more unlikely to deposit on the media than in the case of the media of the Comparative Examples.

EXAMPLE 6

The general procedure of Example 1 was repeated using different amounts of TiO particles based on the magnetic particles, thereby obtaining magnetic tapes. The magnetic characteristic and surface resistivity of these tapes were measured. The results are shown in the sole FIGURE.

From the FIGURE, it will be seen that the magnetic characteristic and surface resistivity decrease with an increase of the TiO content. The effect of addition of TiO particles becomes significant when the content exceeds 0.01 wt%. The content up to 20 wt% is conveniently used in the practice of the invention.

EXAMPLE 7

The general procedure of Example 1 was repeated using, instead of the Fe-Ni alloy, 5% Co-Fe alloy particles having an average size of 0.05 micron, thereby obtaining a magnetic tape.

The tape was measured in the same manner as in Example 1. It was found that the tape had a Br value of 2950 gausses, and a surface resistivity of $2\times10^8$ ohms.

What is claimed is:

1. A magnetic recording medium of the high recording density type comprising a support and a magnetic recording layer formed on at least one side of said support, said magnetic recording layer comprising a dispersion in a binder, of magnetic alloy particles and TiO particles, wherein said TiO particles are present in an amount from 0.1 to 20 weight percent of said magnetic alloy particles and have an average size of from 0.01 to 5 microns.

2. The medium according to claim 1, wherein said support has said magnetic recording layer on one side thereof.

3. The medium according to claim 1, wherein said support has said magnetic recording layer on each side thereof.

4. The medium according to claim 1, wherein said magnetic alloy particles have an average size of from 0.01 to 1 micron.

5. A magnetic recording medium according to claim 1 wherein the magnetic recording layer consists essentially of a dispersion, in a binder, of magnetic alloy particles and TiO particles in an amount from 0.1 to 20 wt. % of said magnetic alloy particles.

6. A magnetic recording medium according to claim 1 wherein the TiO powder comprises black cubic crystals having a specific gravity of 4.0 to 4.9, a pH of $7.0\pm1.0$ and an electric resistance of $10^{-2}$ ohm-cm.

* * * * *